Patented Dec. 19, 1933

1,940,262

UNITED STATES PATENT OFFICE 1,940,262

WELDING FLUX FOR NONFERROUS ALLOYS

Arthur R. Lytle, Bayside, N. Y., assignor to The Linde Air Products Company, a corporation of Ohio No Drawing. Application July 28, 1932
Serial No. 625,538

4 Claims. (Cl. 148—26)

This invention relates to a welding flux for non-ferrous alloys and especially for copper alloys which contain silicon.

The invention has for its object the provision of a flux for welding sections of non-ferrous alloys, and in particular sections which are relatively thick, in a manner which joins the parts in a non-porous homogeneous weld, i. e., one free from pocketed matter and impurities.

It is also an object to provide a flux for non-ferrous alloys, which have an oxidizable constituent such as copper, whereby the weld-metal may be laid-in in a plurality of layers and a fusion weld formed in a manner that avoids pockets and the boiling during welding of the weld-metal.

Other objects of the invention will in part be obvious and will in part appear hereinafter.

The invention accordingly comprises a composition of matter possessing the characteristics, properties and the relation of constituents which will be exemplified in the composition hereinafter described and the scope of the application of which will be indicated in the claims.

In the welding of non-ferrous alloys which have an oxidizable constituent such as zinc, tin, manganese or silicon whose oxides are not readily fusible at the melting temperature of the alloy it is essential that a flux be employed which will protect the fused metal from the atmosphere and maintain the oxides present in a substantially fluid state as well as to retard the solution of gases in the fused metal, whereby a homogeneous weld results.

In the practice of the present invention, where copper bearing alloys, and in particular those which contain silicon, are to be welded, an acid flux adapted to reduce the surface tension of the fused metal in a suitable flame, for example an oxidizing flame, is employed. A suitable flux is an anhydrous acid agent, for example, boric acid. Such a flux when properly fused in the torch flame causes the fused weld-metal to flow and spread itself in the manner desired, but it has been ascertained that the fineness with which the flux is ground is a factor in obtaining uniformity of flow and a resulting weld that is free from pockets. The welding flux here employed is relatively finely ground, the grinding being such as to permit the passage of the flux through a mesh at least as fine as a number 40 mesh. A much finer mesh, however, for example a number 80 mesh, is preferable.

The pure boric acid when used as a flux has a relatively high melting point, and where welding an alloy having a constituent of relatively high heat conductivity such as copper, it is desirable to reduce the melting point of the flux. This is accomplished by adding a modifying agent, care being taken that the agent is not of a character conducive to the formation of an oxidized component of the weld-metal, which would otherwise dissolve in the weld and lead to porosity. A suitable modifying agent is a salt of an alkali-metal, for example sodium fluoride, potassium fluoride, lithium borate, sodium borate, potassium borate, or an admixture thereof. Sodium borate or hydrated sodium borate are relatively inexpensive and are hence preferred.

An addition of sodium borate to the boric acid flux is found to improve greatly the fluidity of the flux and to improve also the character of the weld, avoiding porosity and the formation of blowholes so long as the addition is not in such an amount as to be conducive to the formation of chemical compounds with the constituents of the alloy.

Metals when in the molten state dissolve gases relatively rapidly and during the solidification period such gases are released from solution within the solidifying mass, forming blowholes if the proper casting procedure is not followed. The present flux prevents free access of gas to the molten metal during welding whereby blowholes resulting from this cause are substantially reduced. Silicon when present in alloys in varying amounts has the property of causing such gases as were dissolved in the alloy when the alloy was made to be retained in solution during solidification and so remain dispersed through the solid metal without forming blowholes. Fluxes used heretofore for welding such alloys contain relatively large amount of sodium salts such as sodium borate. When such sodium or alkali salts are melted in the presence of silicon alloyed with other metals chemical action occurs with the formation of alkali borosilicates, reducing temporarily at the point of fusion the amount of silicon in the alloy. This action causes the evolution during solidification of a certain amount of gas that the silicon had held in solution, thereby forming blowholes in the upper layers of the weld metal.

When no alkali metal is present in the flux as when pure boric acid is used, it is not possible to form the borosilicates. To reduce the melting point of the boric acid by the desired amount and still substantially avoid the formation of alkali borosilicates it is found that alkali should be added not in excess of a certain amount. A fluxing composition, according to the present invention, contains a modifying agent such as sodium borate in an amount not in excess of 12%. As little as 2% sodium borate has been observed to be effective in achieving the desired reduction in the melting point of the boric acid. The preferred amount of such modifying agent, however, is in the neighborhood of 8%.

The following are examples of welding flux compositions provided in accordance with the invention:

*Example I*

|  | Percent |
|---|---|
| Boric acid | 92 |
| Sodium borate | 8 |

*Example II*

|  | Percent |
|---|---|
| Boric acid | 88 |
| Sodium fluoride | 6 |
| Potassium borate | 6 |

In using this flux, it may be applied wet or dry and is substantially evenly distributed over the adjacent welding edges of the parts to be welded, the edges being preferably chamfered. The weld metal is now laid-in in a plurality of layers beginning at the bottom of the V. The operator manipulating the torch then follows along in the groove, making fusion welds in a plurality of layers, moving his torch rapidly along to form successive welding puddles; this may be done, on account of the fineness of the flux, without special attention to the avoidance of entrapped flux which would otherwise form blow holes. A quick and expeditious weld is found to result, the weld-metal adhering and forming a joint which is generally stronger than the original metal. Where oxy-acetylene is used to produce the welding flame, care should be exercised to employ only an oxidizing flame and to avoid the deposition of carbon.

Since certain changes may be made in the above composition of matter and different embodiments of the invention could be made without departing from its scope, it is intended that all matter contained in the above description shall be interpreted as illustrative and not in a limiting sense.

Having described my invention, what I claim as new and desire to secure by Letters Patent, is:

1. A flux for welding non-ferrous alloys which consists of finely ground boric acid and a modifying agent chosen from the empirical group consisting of sodium fluoride, potassium fluoride, lithium borate, sodium borate, and potassium borate; said agent being taken in an amount more than 2% and less than 12% of the whole by weight.

2. A flux for welding non-ferrous alloys which consists of boric acid ground to a fineness adapted to pass through a mesh at least as fine as No. 40, and an added modifying agent including a mixture of sodium fluoride and potassium borate taken in an amount greater than 2% and not in excess of 12 percent of the whole.

3. A flux for welding non-ferrous alloys which consists of boric acid ground to a fineness adapted to pass through a mesh at least as fine as No. 40, and an added modifying agent consisting of sodium borate taken in an amount greater than 2% and not in excess of 12%.

4. A flux for welding copper alloys containing silicon which consists of boric acid ground to a fineness adapted to pass through a No. 80 mesh, and a modifying agent consisting of sodium borate taken in an amount substantially 8% by weight of the whole.

ARTHUR R. LYTLE.